United States Patent [19]

Burgess et al.

[11] Patent Number: 5,008,849

[45] Date of Patent: Apr. 16, 1991

[54] APPARATUS ADDING VALUES REPRESENTED AS RESIDUES IN MODULO ARITHMETIC

[75] Inventors: Ian A. Burgess, Horley; Andrew M. Dennis, Redhill; Christopher B. Marshall, Lindfield, all of England

[73] Assignee: U.S. Philips Corporation, New York, N.Y.

[21] Appl. No.: 345,391

[22] Filed: May 1, 1989

[30] Foreign Application Priority Data

Apr. 29, 1988 [GB] United Kingdom ................. 8810167

[51] Int. Cl.$^5$ .............................................. G06F 7/72
[52] U.S. Cl. .................................................. 364/746
[58] Field of Search ............................. 364/746, 746.1

[56] References Cited

U.S. PATENT DOCUMENTS 4,742,479 5/1988 Kloker et al. ....................... 364/746

OTHER PUBLICATIONS

MacWilliams et al., *The Theory of Error-Correctinglodes*, (North Holland 1977) pp. 91-92.

Bliss, "Table Lookup Residue Adder", *IBM Tech. Disclosure Bulletin*, vol. 11, No. 8, Jan. 1969, pp. 1017-1018.

*Primary Examiner*—David M. Malzahn
*Attorney, Agent, or Firm*—Anne E. Barschall

[57] ABSTRACT

In an arithmetic apparatus operands are represented as powers of a generator so that multiplications can be performed as simple additions. However this makes actual addition difficult. Additions are therefore performed by means of a subtractor circuit (1), a Zech table (2) and an adder circuit (3). In order to perform these additions when each power is in plural residue form ($x_1$, $x_2$ and $y_1$, $y_2$) and give the result power also in plural residue form ($i_1$, $i_2$), the subtractor circuit comprises subtractor subcircuits (1A, 1B), the adder circuit comprises adder subcircuits (3A, 3B) and the Zech table is arranged to produced its output also in plural residue form ($j_i$, $j_2$). In order to obtain the correct result even when the power representation $y_1$, $y_2$ represents an operand value of zero the apparatus also includes a detector (58) for this condition, this controlling a multiplexer (61) which then conducts the other operand ($x_1$, $y_1$) to the output (14A', 14B'). The Zech table may be modified so that the apparatus performs subtractions rather than additions.

5 Claims, 4 Drawing Sheets

APPARATUS ADDING VALUES REPRESENTED AS RESIDUES IN MODULO ARITHMETIC

One aspect of this invention relates to apparatus for generating a residue representation modulo (p−1) of the power index i to which a generator g has to be raised to give the value (X+Y) in modulo p arithmetic in response to the application to said apparatus of residue representations modulo (p−1) of x, where $g^x=X$, and y, where $g^y=Y$, which apparatus has first and second inputs for the residue representations of x and y respectively and an output for the residue representation of i and comprises

- a subtractor circuit to first and second inputs of which the first and second inputs respectively of the apparatus are coupled, for generating a residue representation modulo (p−1) of (x−y) at an output thereof,
- a look-up table circuit having an input coupled to the output of the subtractor circuit, for generating at an output thereof a residue representation modulo (p−1) of the power index j to which g has to be raised to give the value $g^k+1$ in modulo p arithmetic in response to the application to said input of a representation modulo (p−1) of any member of a set of values of k, and
- an adder circuit having first and second inputs to which are coupled the second input of the arrangement and the output of the look-up table circuit respectively, for generating at an output thereof a residue representation modulo (p−1) of r+j in response to the application to its first and second inputs of residue representations modulo (p−1) of r and j respectively, which output constitutes the output of the arrangement.

Apparatus of the above kind is discussed, for example, on page 91-92 of the book "The Theory of Error-Correction Codes", Part 1, by F. J. MacWilliams and N. J. A. Sloane (North-Holland Publishing Company, 1977).

The computation of the arithmetical sum of input quantities tends to be a simpler and faster process than the computation of their arithmetical product, and this fact has given rise to such expedients as the use of logarithms whereby a multiplication or division operation is transformed into an addition operation or a subtraction operation respectively, albeit at the expense of necessitating the initial conversion of the input quantities to their logarithms and the final conversion of the output to its antilogarithm. If the basic arithmetic is carried out in the residue number system (RNS) then, as is known from e.g. the article "On the Design of Modulo Arithmetic Units Based on Cyclic Groups" by S. S. Yau and J. Chung in I.E.E.E. Trans. on Computers Vol. C-25 No. 11 (November 1976) and the article "Implementation of Multiplication, Modulo a Prime Number, with Applications to Number Theoretic Transforms" by G. A. Jullien, in I.E.E.E. Trans. on Computers, Vol. C-29 No. 10 (October 1980), a multiplication operation modulo p where p is a prime number or a power of a prime number maps into a modulo (p−1) addition. In other words the "logarithms" of the modulo p basic input operands (respective powers of a generator g where g is the (p−1)$^{th}$ root of unity, i.e. $g^{(p-1)}=1$ mod p) are themselves modulo (p−1). Thus, as a simple example, if the basic arithmetic is carried out in an RNS channel modulo 13 (for which g=2) the basic input operands may be initially converted to their "logarithms" according to the following table.

| Input operand n | "Logarithm" X (where $g^x$ mod 13 = n) |
|---|---|
| 1 | 0 |
| 2 | 1 |
| 3 | 4 |
| 4 | 2 |
| 5 | 9 |
| 6 | 5 |
| 7 | 11 |
| 8 | 3 |
| 9 | 8 |
| 10 | 10 |
| 11 | 7 |
| 12 | 6 |

Then a multiplication operation may be carried out on say, two modulo 13 input operands $n_1$ and $n_2$ by adding together the corresponding values of x modulo 12 and looking up the value of corresponding to the result. For example, in order to multiply 3 by 5 one adds 4 and 9 modulo 12 to give 1 mod 12. From the table x=1 corresponds to n=2, which is 15 mod 13 as required. Many computations, however, comprise a mixture of multiplication/division and addition/subtraction, and once conversion to logarithms has been effected addition/subtraction becomes difficult unless it is proceded by the taking of antilogarithms (with the possible consequence that it has also to be succeeded by the taking of logarithms once again) thereby at least partly nullifying the advantages obtained by the taking of logarithms in the first place. In order to mitigate this disadvantage, at least when the computation is carried out in a Galois field, it is known from e.g. pages 91-92 of the book quoted above to make use of the process/apparatus illustrated in block diagrammatic form in FIG. 1 of the accompanying drawings. A representation of an output quantity i, where $g^i=X+Y$ and g is a generator, is generated from representations of input quantities x and y, where $g^x=X$ and $g^y=Y$, by means of a subtractor 1, a look-up table 2, and an adder 3, thereby in effect performing an addition operation while maintaining the input and output quantities in logarithmic form so that the taking of "antilogarithms" need only be carried out at the end of the overall "calculation". More particularly, the representations of the input quantities x and y are applied via inputs 10 and 11 respectively to inputs 4 and 5 respectively of the subtractor 1 the output 6 of which is connected to the input 7 of the look-up table 2. The output 8 of the look-up table 2 is connected to the input 9 of the adder 3 a second input 12 of which is connected to the input terminal 11 and is hence fed with the representation of the input quantity y. The output 13 of adder 3 is connected to the apparatus output 14. Subtractor 1 generates a representation of the quantity (x−y) at its output 6. Look-up table 2 is a so-called Zech table and generates, when a representation of the quantity k=(x−y) is applied to its input 7, a representation of the quantity j at its output 8, where $g^j=g^k+1$. Adder 3 generates a representation of the quantity i=r+j at its output 13, where r=y. It will be noted that $g^i=g^{y+j}=g^yg^j=g^y(g^{x-y}+1)=g^x+g^y=X+Y$ as required, and that this result has been obtained by means of one subtraction operation, one addition operation and one look-up operation. As an example, for modulo 13 basic arithmetic and with g=2 the Zech table is the following

| Input (x−y) | $g^{x-y}$ | $g^{x-y}+1$ | Output j |
|---|---|---|---|
| Nil | 0 | 1 | 0 |
| 0 | 1 | 2 | 1 |
| 1 | 2 | 3 | 4 |
| 2 | 4 | 5 | 9 |
| 3 | 8 | 9 | 8 |
| 4 | 3 | 4 | 2 |
| 5 | 6 | 7 | 11 |
| 6 | 12 | 0 | Nil |
| 7 | 11 | 12 | 6 |
| 8 | 9 | 10 | 10 |
| 9 | 5 | 6 | 5 |
| 10 | 10 | 11 | 7 |
| 11 | 7 | 8 | 3 |

The entries "Nil" indicate the special state that corresponds to a number zero, which cannot be represented in the form $g^n$ and has to be represented differently.

The above is an example of the fact that, if the basic arithmetic in, for example, a given channel of an RNS arrangement, is modulo a prime number p (where p=13 in this case) or a power of a prime number, the powers of the generator g to which the input operands are converted are modulo a number (p−1=12 in this case) which itself can be factorised (factors 3 and 4 in this case). Thus these powers can in turn be represented by means of a residue number system during their manipulation for the purposes of the calculation required, as is noted in the first of the two articles quoted previously. Thus the input and output quantities n of the table above can be represented in the following way.

| n | n mod 3 | n mod 4 |
|---|---|---|
| 0 | 0 | 0 |
| 1 | 1 | 1 |
| 2 | 2 | 2 |
| 3 | 0 | 3 |
| 4 | 1 | 0 |
| 5 | 2 | 1 |
| 6 | 0 | 2 |
| 7 | 1 | 3 |
| 8 | 2 | 0 |
| 9 | 0 | 1 |
| 10 | 1 | 2 |
| 11 | 2 | 3 |

As from n=12 (the product of the moduli used) the representations repeat: 12=0,0; 13=1,1 etc., but it will be appreciated that the number of values of n which can be uniquely represented can be extended at will by using larger and/or more moduli. Arithmetic operations can be performed on the individual residue components independently. For example 4+5=(1,0)+(2,1)=(1+2, 0+1)=(0 mod 3, 1 mod 4), which is the representation of 9 as required. Similarly 2×3=(2,2)×(0,3)=(2×0, 2×3)=(0 mod 3, 2 mod 4), which is the representation of 6 as required.

It will be noted that these calculations do not entail the time-consuming propagation of carries and that the operations in the various moduli are completely independent of each other. It is an object of the present invention to make use of the fact that the powers of the generator g can themselves be represented by means of a residue number system to obtain benefits in, inter alia, an apparatus as defined in the first paragraph, and to this end such an apparatus is, according to one aspect of the invention, characterised in that in order that the residue representation of i will be generated at the output of the apparatus in the form of n residue components modulo respective integers which are mutually prime and the product of which is equal to (p−1), where n is greater than unity, and in order that the residue representations of x and y can be supplied to the first and second inputs of the apparatus each also in the form of n residue components modulo the same said respective integers, (a) the subtractor circuit comprises n subtractor subcircuits to first inputs of which are coupled respective non-overlapping fields of the first input of the apparatus and second inputs of which are coupled respective non-overlapping fields of the second input of the apparatus, each said subtractor subcircuit being arranged to generate at an output thereof a residue representation modulo a respective said integer of the difference between first and second quantities in response to the application of residue representations of said quantities modulo the corresponding said integer to its first and second inputs respectively, said outputs constituting respective non-overlapping fields of the subtractor circuit output, (b) the adder circuit comprises n adder subcircuits to first inputs of which are coupled the said respective non-overlapping fields of the second input of the apparatus and to second inputs of which are coupled respective non-overlapping fields of the output of the look-up table circuit, each said adder subcircuit being arranged to generate at an output thereof a residue representation modulo a respective said integer of the sum of first and second quantities in response to the application of residue representations of said quantities modulo the corresponding said integer to its first and second inputs respectively, said outputs constituting respective non-overlapping fields of the adder circuit output, and (c) the look-up table circuit is arranged to generate each said residue representation of j in the form of n residue components each modulo a respective said integer and each at a respective one of the said non-overlapping fields of its output.

It has now been recognised that apparatus of the general kind illustrated in FIG. 1 can be used even when the input quantities are in plural residue form and the output quantity is required to be in plural residue form, and that this can be done without it being necessary to convert each input quantity to non plural residue form and to convert an output quantity in non plural residue form into one which is. The result is that an addition operation can be performed in respect of a pair of power-represented input operands (each of which may be positive or negative), where the powers themselves are in plural residue form, while maintaining to a considerable extent the benefits of the plural residue representations in the carrying out of this operation.

According to another aspect the invention provides apparatus for generating a residue representation modulo (p−1) of the power index i to which a generator g has to be raised to give the value (X−Y) in modulo p arithmetic in response to the application to said apparatus of residue representations modulo (p−1) of x, where $g^x=X$, and y, where $g^y=Y$, which apparatus has first and second inputs for the residue representations of x and y respectively and an output for the residue representation of i and comprises a subtractor circuit to first and second inputs of which the first and second inputs respectively of the apparatus are coupled, for generating a residue representation modulo (p−1) of (x−y) at an output thereof, a look-up table circuit having an input coupled to the output of the subtractor circuit, for generating at an output thereof a residue representation modulo (p−1) of the power index j to which g has to be raised to give the value $g^k-1$ in modulo p arithmetic in response to the application to said input of a residue representation modulo (p−1) of any member of a set of values of k, and an adder circuit having first and second inputs to which are coupled the second input of the arrangement and the output of the look-up table circuit respectively, for generating at an output thereof a residue representation modulo (p−1) of r+j in response to the application to its first and second inputs of residue representations modulo (p−1) of r and j respectively, which output constitutes the output of the arrangement, characterised in that in order that the residue representation of i will be generated at the output of the apparatus in the form of n residue components modulo respective integers which are mutually prime and the product of which is equal to (p−1), where n is greater than unity, and in order that the residue representations of x and y can be supplied to the first and second inputs of the apparatus each also in the form of n residue components modulo the same said respective integers (a) the subtractor circuit comprises n subtractor subcircuits to first inputs of which are coupled respective non-overlapping fields of the first input of the apparatus and to second inputs of which are coupled respective non-overlapping fields of the second input of the apparatus, each said subtractor subcircuit being arranged to generate at an output thereof a residue representation modulo a respective said integer of the difference between first and second quantities in response to the application of residue representations of said quantities modulo the corresponding said integer to its first and second inputs respectively, said outputs constituting respective non-overlapping fields of the subtractor circuit output, (b) the adder circuit comprises n adder subcircuits to first inputs of which are coupled the said respective non-overlapping fields of the second input of the apparatus and to second inputs of which are coupled respective non-overlapping fields of the output of the look-up table circuit, each said adder subcircuit being arranged to generate at an output thereof a residue representation modulo a respective said integer of the sum of first and second quantities in response to the application of residue representations of said quantities modulo the corresponding said integer to its first and second inputs respectively, said outputs constituting respective non-overlapping fields of the adder circuit output, and (c) the look-up table circuit is arranged to generate each said residue representation of j in the form of n residue components each modulo a respective said integer and each at a respective one of the said non-overlapping fields of its output.

If X or Y is zero, the corresponding value of x or y is minus infinity. The simple configuration of subtractor, adder and look-up table circuits referred to so far can be arranged to respond correctly to the situation where X=0, but a situation where Y=0 is liable to cause problems. If, therefore, Y=0 is a practical possibility, the apparatus preferably includes a circuit arrangement for detecting when a representation of y which corresponds to Y=0 is applied to the second input of the apparatus and replacing any representation which would otherwise be applied to the apparatus output in response to this condition by any representation then applied to the first input of the apparatus. If this is the case the apparatus will produce the correct output even when Y=0.

The representations used for the input and output quantities of the adder and subtractor subcircuits may of course be chosen at will. They may, for example each be in the form of a one-out-of-m code, where m is the corresponding said respective integer; such a choice can give a considerable degree of protection against incorrect results being obtained due, for example, to the presence of noise.

Embodiments of the invention will now be described, by way of example, with reference to the accompanying diagrammatic drawings in which.

Figure 1:
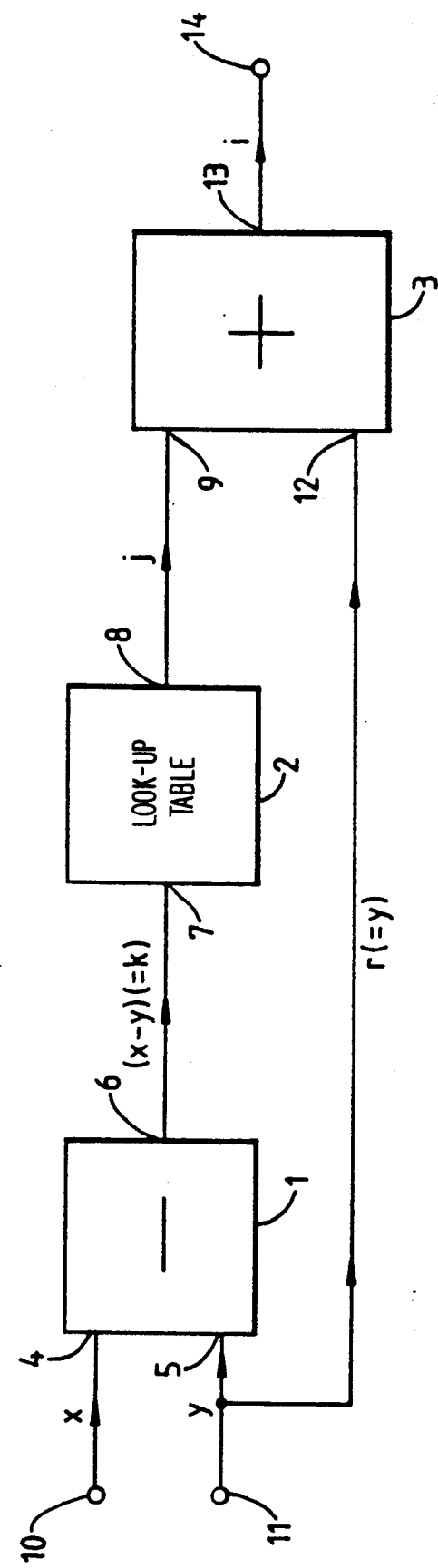
FIG. 1 is a block diagram of the known apparatus referred to hereinbefore.
Figure 2:
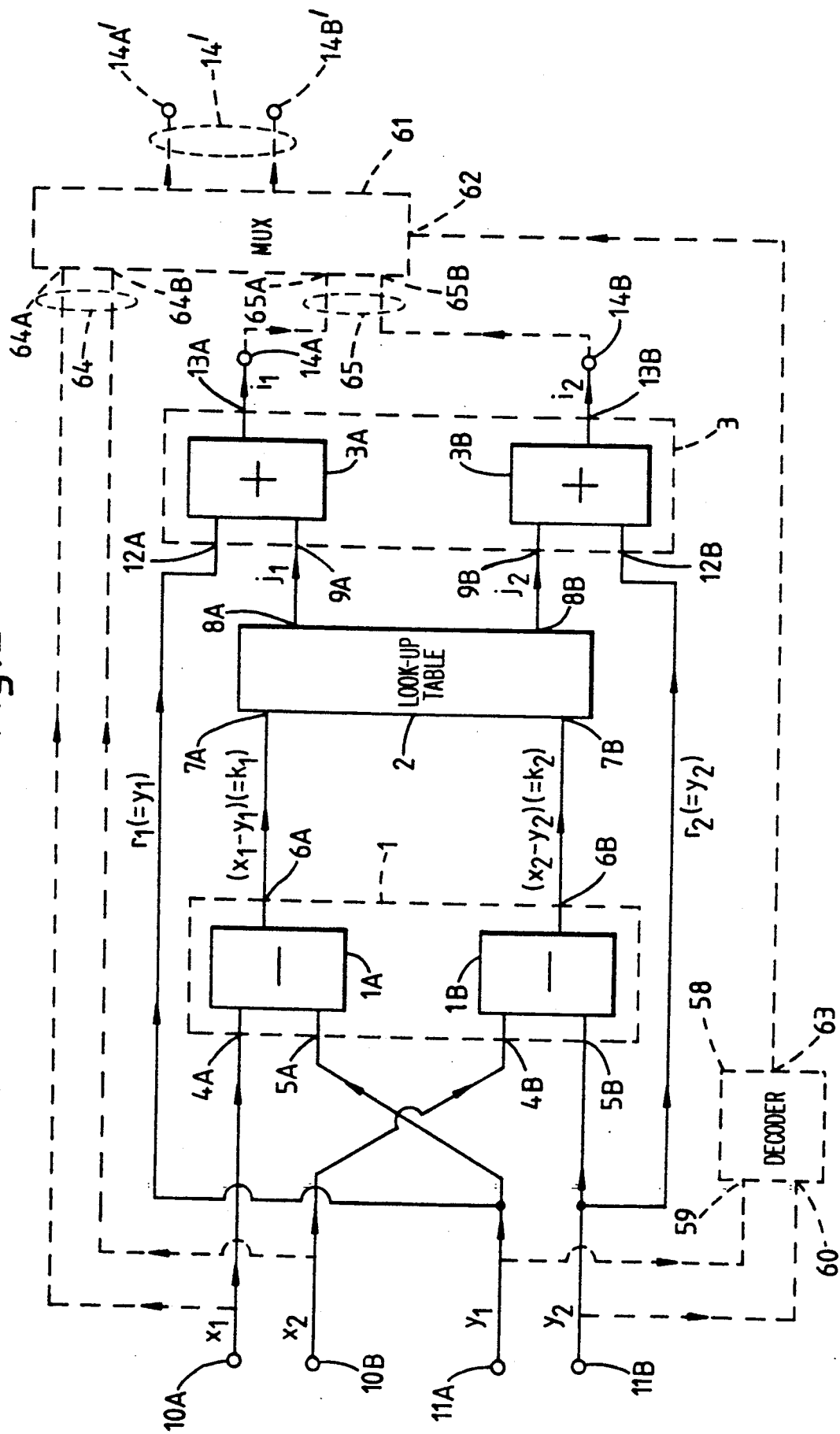
FIG. 2 is a block diagram of an embodiment of the invention.

FIG. 2 is, similar to FIG. 1, a block diagram of apparatus for generating a residue representation modulo (p−1) of the power index i to which a generator g has to be raised to give the value (X+Y) in modulo p arithmetic in response to the application to said apparatus of residue representations modulo (p−1) of x, where $g^x=X$, and y, where $g^y=Y$. The part of the block diagram of FIG. 2 which is shown in full lines comprises, similarly to the known apparatus shown in FIG. 1, a subtractor 1, a look-up table 2 and an adder 3, connected as shown. However, subtractor 1 now comprises two subtractor subcircuits 1A and 1B respectively and adder 3 now comprises two adder subcircuits 3A and 3B respectively. The apparatus input 10 now has two components 10A and 10B which constitute respective non-overlapping fields thereof and the apparatus input 11 now has two components 11A and 11B which constitute respective non-overlapping fields thereof. The components 10A and 11A are connected to respective inputs 4A and 5A of the subtractor subcircuit 1A and the components 10B and 11B are connected to respective inputs 4B and 5B of the subtractor subcircuit 1B. The input 7 of the look-up table 2 now has two components 7A and 7B which constitute respective non-overlapping fields thereof and to which are connected the outputs 6A and 6B of the subtractor respectively. The outputs 6A and 6B constitute respective non-overlapping fields of the subtractor output 6. The output 8 of the look-up table 2 similarly now has two components 8A and 8B which constitute respective non-overlapping fields thereof and which are connected to first inputs 9A and 9B of the adder subcircuits 3A and 3B respectively. The components 11A and 11B of the apparatus input 11 are connected to second inputs 12A and 12B of the adder subcircuits 3A and 3B respectively. The apparatus output 14 now has two components 14A and 14B which constitute respective non-overlapping fields thereof and to which are connected the outputs 13A and 13B of the adder subcircuits 3A and 3B respectively. The outputs 13A and 13B constitute respective non-overlapping fields of the adder circuit output 13. The further components shown in dashed lines will be referred to below.

The subtractor subcircuit 1A is arranged to generate at its output 6A a residue representation modulo a specific integer n1 of the difference $(x_1-y_2)$ between first and second quantities $x_1$ and $y_1$ in response to the application of residue representations of these quantities modulo n1 to its inputs 4A and 5A respectively. Similarly the subtractor subcircuit 1B is arranged to generate at its output 6B a residue representation modulo a specific integer n2 of the difference $(x_2-y_2)$ between first and second quantities $x_1$ and $x_2$ in response to the application of residue representations of these quantities modulo n2 to its inputs 4B and 5B respectively. n1 and n2 are mutually prime, i.e. they have no factors other than unity in common. The subtractor 1 consisting of the subtractor subcircuits 1A and 1B therefore responds to the application of representations of quantities x and y to the apparatus inputs 10 and 11 respectively, each of these representations being in residue form modulo n1 and n2, i.e. x being in the form $x_1$ mod n1, $x_2$ mod n2 and y being in the form $y_1$ mod n1, $y_2$ mod n2 where the representations of $x_1$, $x_2$, $y_1$ and $y_2$ are applied to the fields 10A, 10B, 11A and 11B respectively of the apparatus inputs 10 and 11, by generating at its output 6 a representation of $x-y$. This representation of $x-y$ is itself in residue form modulo n1 and n2, the residue modulo n1 $(=x_1-y_1)$ being generated in the field 6A of the output 6 and the residue modulo n2 $(=x_2-y_2)$ being generated in the field 6B of the output 6. These residue representations are applied as residue components $k_1$ and $k_2$ respectively to the fields 7A and 7B respectively of the input 7 of the look-up table 2.

The look-up table 2 is arranged to respond to the application to its input 7A, 7B of a modulo $(p-1)$ representation of k, for any member of a set of values of k, by generating at its output 8 a representation modulo $(p-1)$ of the power index j to which a generator g has to be raised to give the value $g^k+1$ in modulo p arithmetic where $n1 \times n2 = (p-1)$, this representation of j being in residue form modulo n1 and n2, the residue representation modulo n1 ($j_1$) being generated in the field 8A of the output 8 and the residue representation modulo n2 ($j_2$) being generated in the field 8B of the output 8.

The adder subcircuit 3A is arranged to generate at its output 13A a residue representation modulo n1 of the sum $(r_1+j_1)$ of first and second quantities $r_1$ and $j_1$ in response to the application of residue representations of these quantities modulo n1 to its inputs 12A and 9A respectively. Similarly the adder subcircuit 3B is arranged to generate to generate at its output 13A a residue representation modulo n2 of the sum $(r_2+j_2)$ of first and second quantities $r_2$ and $j_2$ in response to the application of residue representations of these quantities modulo n2 to its inputs 12B and 9B respectively. The adder 3 consisting of the adder subcircuits 3A and 3B therefore responds to the application of representations of quantities y $(=r)$ and j to its inputs 9 and 12 respectively, each of these representations being in residue form modulo n1 and n2, i.e. y being in the form y1 mod n1, y2 mod n2 and j being in the form $j_1$ mod n1, $j_2$ mod n2 where the representations of $y_1$, $y_2$, $j_1$ and $j_2$ are applied to the input fields 12A, 12B, 9A and 9B respectively, by generating at its output 13 a representation i of $y+j$. This representation i is itself in residue form modulo n1 and n2, the representation of the residue modulo n1 $(=y_1+j_1=i_1)$ being generated in the field 13A and being applied to the field 14A of the apparatus output and the representation of the residue modulo n2 $(=y_2+j_2=i_2)$ being generated in the field 13B and being applied to the field 14B of the apparatus output.

The function of the complete apparatus shown in FIG. 2 is therefore to respond to the application of representations $x_1$ and $x_2$ of x to input fields 10A and 10B respectively, and representations $y_1$ and $y_2$ of y to input fields 11A and 11B respectively, where $g^x=X$ and $g^y=Y$, by generating the representations $i_1$ and $i_2$ of i at the output fields 14A and 14B respectively. As shown in the preamble i is the power index to which the generator g has to be raised to give the value $(X+Y)$, as required.

The residue representations may each be, for example, in the form of a compact binary code or a "one out of m" code, wherein m is the modulus used for the relevant representation. Thus in the latter case the inputs 10A and 10B of FIG. 2 may be $n_1$ bits wide and $n_2$ bits wide respectively, as may be the inputs 11A and 11B and the outputs 14A and 14B, each possible value of the relevant representation then being denoted by a value of binary "1" (or "0") for a respective one of the relevant bits. As a simple example, if the values of $n_1$ and $n_2$ are 3 and 4 respectively then the numbers n from 0 to 11 can, for example, be represented as follows:

| n  | n mod 3 | n mod 4 |
|----|---------|---------|
| 0  | 001     | 0001    |
| 1  | 010     | 0010    |
| 2  | 100     | 0100    |
| 3  | 001     | 1000    |
| 4  | 010     | 0001    |
| 5  | 100     | 0010    |
| 6  | 001     | 0100    |
| 7  | 010     | 1000    |
| 8  | 100     | 0001    |
| 9  | 001     | 0010    |
| 10 | 010     | 0100    |
| 11 | 100     | 1000    |

If the above coding is used for the input quantities $(x-y)$ to, and the output quantities j from, the look-up table 2 of FIG. 2, this look-up table will have to be programmed to produce the following relationship between its input and output codes.

| Input code | Output code |
|------------|-------------|
| Nil        | 001 0001    |
| 001 0001   | 010 0010    |
| 010 0010   | 010 0001    |
| 100 0100   | 001 0010    |
| 001 1000   | 100 0001    |
| 010 0001   | 100 0100    |
| 100 0010   | 100 1000    |
| 001 0100   | Nil         |
| 010 1000   | 001 0100    |
| 100 0001   | 010 0100    |
| 001 0010   | 100 0010    |
| 010 0100   | 010 1000    |
| 100 1000   | 001 1000    |

(The entries "Nil" may be represented by a particular unique code, for example 111 0000.) Such a relationship can be obtained, for example, by suitably programming a read-only memory the address input of which is fed with the input code. As an alternative it can be obtained by means of a suitably configured combinatorial logic circuit.

Figure 3:
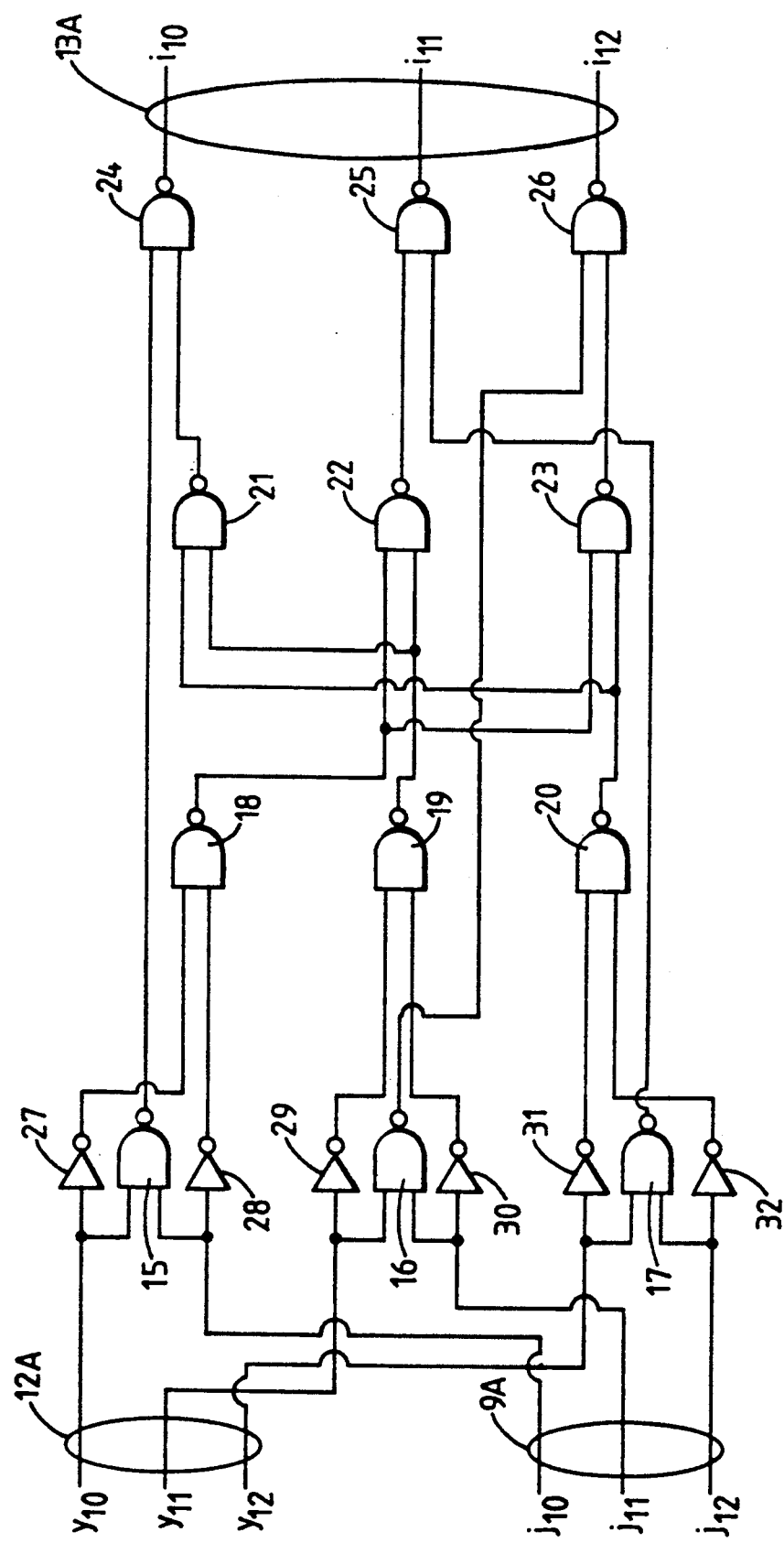
FIG. 3 is the circuit diagram of a possible construction for one of the blocks of FIG. 2.

FIG. 3 is the circuit diagram of a possible construction for the modulo 3 adder subcircuit 3A of FIG. 2 if the coding specified above, and the particular code specified for "Nil", are employed. The particular construction shown is suitable for implentation by means of a programmed logic array (PLA) and comprises twelve NAND gates 15-26 and six inverters 27-32 interconnected and connected to the inputs 12A and 9A, and the output 13A, as shown. The successive bits $y_{10}$, $y_{11}$, $y_{12}$ (reading from right to left above) of the code for quantity $y_1$ are applied to respective lines of the input 12A as shown, and the successive bits $j_{10}$, $j_{11}$, $j_{12}$ of the code for the quantity $j_1$ are applied to respective lines of the input 9A as shown. The successive bits $i_{10}$, $i_{11}$, $i_{12}$ of the code for the quantity $i_1$ appear on respective lines of the output 13A as shown. Inspection will reveal that the truth table for the construction of FIG. 3 is that required.

The circuit configuration of FIG. 3 is also suitable for use as the modulo 3 subtractor subcircuit 1A of FIG. 2, in which case the references 12A, 9A, 13A, $y_{10}$, $y_{11}$, $y_{12}$, $j_{10}$, $j_{11}$, $j_{12}$, $i_{10}$, $i_{11}$ and $i_{12}$ used at the inputs and output should be replaced by 4A, 5A, 6A, $x_{10}$, $x_{11}$, $x_{12}$, $y_{10}$, $y_{12}$, $y_{11}$, $(x_1-y_1)_0$, $(x_1-y_1)_1$ and $(x_1-y_1)_2$ respectively, where $x_{10}$, $x_{11}$ and $x_{12}$ are the successive bits of the code for the quantity $x_1$ and $(x_1-y_1)_0$, $(x_1-y_1)_1$ and $(x_1-y_1)_2$ are the successive bits of the code for the quantity $(x_1-y_1)$. (These replacements make use of the fact that, in modulo $(p-1)$ arithmetic, the negative of a number is equal to $(p-1)$ minus that number).

Figure 4:
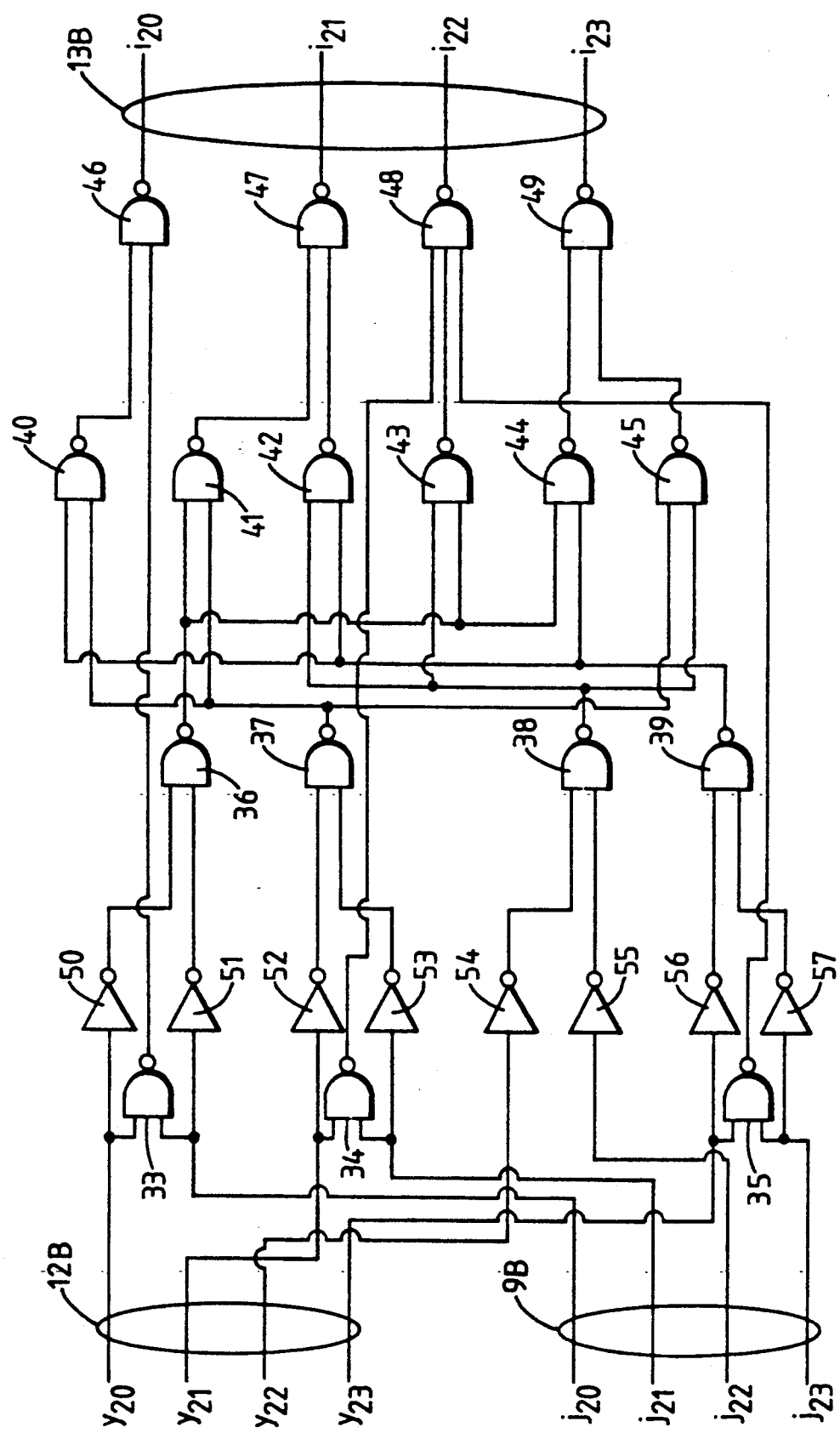
FIG. 4 is the circuit diagram of a possible construction for another of the blocks of FIG. 2.

FIG. 4 is the circuit diagram of a possible construction for the modulo 4 adder subcircuit 3B of FIG. 2 if the specified coding is employed. This construction is also suitable for implementation by means of a programmed logic array and comprises seventeen NAND gates 33-49 and eight inverters 50-57 interconnected and connected to the inputs 12B and 9B, and the output 13B, as shown. The successive bits $y_{20}$, $y_{21}$, $y_{22}$ and $y_{23}$ of the code for the quantity $y_2$ are applied to respective lines of the input 12B as shown, and the successive bits $j_{20}$, $j_{21}$, $j_{22}$ and $j_{23}$ of the code for the quantity $j_2$ are applied to respective lines of the input 9B as shown. The successive bits $i_{20}$, $i_{21}$, $i_{22}$ and $i_{23}$ of the code for the quantity $i_2$ appear on respective lines of the output 13B as shown.

The circuit configuration of FIG. 4 is also suitable for use as the modulo 4 subtractor subcircuit 1B of FIG. 2, in which case the references 12B, 9B, 13B, $y_{20}$, $y_{21}$, $y_{22}$, $y_{23}$, $j_{20}$, $j_{21}$, $j_{22}$, $j_{23}$, $i_{20}$, $i_{21}$, $i_{22}$, and $i_{23}$ used at the inputs and output should be replaced by 4B, 5B, 6B, $x_{20}$, $x_{21}$, $x_{22}$, $x_{23}$, $y_{20}$, $y_{23}$, $y_{22}$, $y_{21}$, $(x_2-y_2)_0$, $(x_2-y_2)_1$, $(x_2-y_2)_2$ and $(x_2-y_2)_3$ respectively, where $x_{20}$, $x_{21}$, $x_{22}$ and $x_{23}$ are the successive bits of the code for the quantity $x_2$ and $(X_2-y_2)_0$, $(x_2-y_2)_1$, $(x_2-y_2)_2$ and $(x_2-y_2)_3$ are the successive bits of the code for the quantity $(x_2-y_2)$. This again makes use of the fact that, in modulo $(p-1)$ arithmetic, the negative of a number is equal to $(p-1)$ minus that number.

There is one possible circumstance in which the arrangement shown in full lines in FIG. 2 will not give the correct result, this being when the quantity represented by the code $y_1$, $y_2$ applied to the input 11A, 11B is "nil" (this itself being a power representation of $Y=0$). The resulting output from adder 3 should be a quantity which is a power representation of X, i.e. $x_1$, $x_2$, under these circumstances, but in fact the output of the look-up table 2 will be zero and that from the adder 3 will be "nil". If such a value of "nil" is possible for $y_1$, $y_2$ then, in order that the arrangement will give the correct output when this is the case, the further components shown in dashed lines in FIG. 2 may also be provided, these being a decoder 58 having inputs 59 and 60 connected to the components 11A and 11B respectively of the apparatus input 11, and a multiplexer 61 the control input 62 of which is connected to the output 63 of decoder 58. Components 64A and 64B of a first signal input 64 of multiplexer 61 are connected to the components 10A and 10B of the apparatus input 10 and components 65A and 65B of a second signal input 65 of the multiplexer 61 are connected to the outputs 13A and 13B respectively of the adder circuit 3. Components 14A' and 14B' of the output 14' of multiplexer 61 constitute respective components of the new output of the apparatus.

Decoder 58 is constructed to detect the code for "nil" on the apparatus input 11A, 11B and produce a signal on its output 63 when this occurs. Multiplexer 61 is constructed to respond to the presence of such a signal on its control input 62 by connecting the components 64A and 64B of its first input 64 to the components 14A' and 14B' respectively of its output 14, the components 65A and 65B of its second input 65 being connected to the components 14A' and 14B' respectively otherwise. The result is therefore that the apparatus produces the same output codes at its output 14A', 14B' as it does at its output 14A, 14B except when the code applied to the input 11A, 11B is "nil". When this last is the case the code $x_1$, $x_2$ appears at the output 14A', 14B', as required.

It will be appreciated that the look-up table circuit 2 of FIG. 2 may alternatively be arranged to generate at its output 8A, 8B a residue representation modulo $(p-1)$ of the power index j to which g has to be raised to give the value $g^k-1$ in modulo p arithmetic in response to the application to its input 7A, 7B of a representation modulo $(p-1)$ of any member of a set of values of k. In such a case $g^i=g^{y+j}=g^y g^j=g(g^x-y-1)=g^x-g^y=X-Y$, i.e. the plural residue representation generated at the output 14A, 14B will be of the power index i to which g has to be raised to give the value $(X-Y)$ in modulo p arithmetic, instead of $(X+Y)$. If, for example, the values of $n_1$ and $n_2$ are 3 and 4 respectively as used above in the illustrative example discussed with reference to FIG. 2, and the input and output quantities of the look-up table 2 are again each represented as a one-out-of-three code together with a one-out-of-four code as discussed previously, then in the alternative the look-up table 2 may be programmed to give the following relationship between its input and output codes.

| Input code | Output code |
| --- | --- |
| Nil | 001 0100 |
| 001 0001 | Nil |
| 010 0010 | 001 0001 |
| 100 0100 | 010 0001 |
| 001 1000 | 100 1000 |
| 010 0001 | 010 0010 |
| 100 0010 | 001 0010 |
| 001 0100 | 010 1000 |
| 010 1000 | 010 0100 |
| 100 0001 | 001 1000 |
| 001 0010 | 100 0100 |
| 010 0100 | 100 0001 |

-continued

| Input code | Output code |
|---|---|
| 100 1000 | 100 0010 |

It will be appreciated that the choices of modulo p=13 arithmetic and the representation of each of the quantities x, y (=r), (x−y) (=k), j and i in the form of n=2 residue components modulo 3 and 4 respectively in the embodiments described have been made purely by way of example. In practice a considerably larger value of p will usually be employed. Thus, in another example, modulo p=181 arithmretic may be employed and the representations of each of the quantities x, y, (x−y), j and i may be in the form of n=3 residue components modulo 4, 5 and 9 respectively. In such case subtractor circuit 1 will have to comprise three subtractor subcircuits which operate modulo 4, modulo 5 and mudulo 9 respectively and which are fed from respective corresponding non-overlapping fields of the inputs 10 and 11, and adder circuit 3 will similarly have to comprise three adder subcircuits which operate modulo 4, modulo 5 and modulo 9 respectively and which are fed from respective corresponding non-overlapping fields of the input 11 and the ouput 8 of look-up table 2.

As mentioned previously the look-up table 2 to FIG. 2 may be formed, for example, by a suitably programmed read-only memory, a respective non-overlapping field of each output word thereof consistituting the output 8A and the output 8B. Of course, two separate read-only memories may alternatively be employed for this purpose, respective fields of the address input of each one of these being fed from the outputs 6A and 6B of subtractor subcircuits 1A and 1B respectively and the outputs of these memories constituting the outputs 8A and 8B respectively. Again as already mentioned previously, the look-up table 2 of FIG. 2 may, as another example, be formed by means of combinatorial logic. For example, each combination of codes applied to the inputs 7A and 7B may be manipulated by logic circuitry to produce a binary "1" (or "0") on a respective one out of, in the example, thirteen lines, thereby indicating the presence of a respective one of the thirteen possible input states. This binary "1" or "0" can then be used to drive a further logic circuit which, in response, generates the required corresponding codes on the outputs 8A and 8B.

As an alternative to constructing the adder or subtractor subcircuits 1A, 1B, 3A and 3B by means of combinatorial logic circuitry, for example as described with reference to FIGS. 3 and 4, it will be evident that each could be formed by a suitably programmed read-only memory.

Although, as described, the same coding scheme is used for the quantities represented throughout the apparatus, it will be evident that this is not necessarily the case. For example, a one-out-of-N coding scheme may be used for the quantities $x_1$, $x_2$, $y_1$, $y_2$, $i_1$ and $i_2$ whereas the subtractor circuits 1A and 1B and the look-up table 2 may be constructed to produce their outputs in the form of a conventional compact binary code, the look-up table 2 and the adder subcircuits 3A and 3B being modified accordingly so as to respond in the desired manner to the compact binary codes used.

It will be evident that, because the processing takes place in the apparatus described in three distinct stages, i.e. subtraction, look-up and addition, so-called "pipelining" may readily be employed to optimise the processing throughput for a succession of input operands.

If desired the technique for reducing the size of the Zech table 2 required, as described and claimed in copending patent application Ser. No. 345,392 filed May 1, 1989, may be employed in apparatus according to the present invention.

From reading the present disclosure, other modifications will be apparent to persons skilled in the art. Such modifications may involve other features which are already known in the design, manufacture and use of arithmetic apparatus and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. Apparatus for generating a residue representation modulo p−1 of the power index i to which a generator g has to be raised to give the value X+Y in modulo p arithmetic in response to the application to said apparatus of residue representations modulo p−1 of x, where $g^x=X$, and y, where $g^y=Y$, which apparatus has first and second inputs for the residue representations of x and y respectively and an output for the residue representation of i and comprises
   (a) a subtractor circuit having
      (i) first and second inputs coupled to the first and second inputs, respectively, of the apparatus,
      (ii) and an output at which a a residue representation modulo p−1 of x−y is generated,
   (b) a look-up table circuit having
      (i) an input coupled to the output of the subtractor circuit, and
      (ii) an output at which is generated a residue representation modulo p−1 of the power index i, to which g has to be raised to give the value $g^k+1$ in modulo p arithmetic, in response to the application to said input of the look-up table circuit of a residue representation modulo p−1 of any member of a set of values of k, and
   (c) an adder circuit having
      (i) first and second inputs coupled to the second input of the arrangement and the output of the look-up table circuit, respectively, and
      (ii) an output at which is generated a residue representation modulo p−1 of r+j in response to the application to the first and second inputs of the adder circuit of residue representations modulo p−1 of r and j, respectively, which output constitutes the output of the arrangement,
wherein the improvement comprises that; in order that the residue representation of i will be generated at the output of the apparatus in the form of n residue components modulo respective integers which are mutually prime and the product of which is equal to p−1, where n is greater than unity, and in order that the residue representations of x and y can be supplied to the first and second inputs of the apparatus each also in the form of n residue components modulo the same said respective integers;

(d) the first input of the apparatus comprises n first sub-inputs, each for receiving a respective residue representation modulo a said integer, said first sub-inputs constituting respective non-overlapping fields of said first input, (e) the second input of the apparatus comprises n second sub-inputs, each for receiving a respective residue representation modulo a said integer, said second sub-inputs constituting respective non-overlapping fields of said second input, (f) the subtractor circuit comprises n respective subtractor subcircuits, each having
  (i) a respective first input coupled to a respective one of the non-overlapping fields of the first input of the apparatus,
  (ii) a respective second input coupled to a respective one of the non-overlapping fields of the second input of the apparatus,
  (iii) a respective output at which is generated a respective residue representation, modulo a respective said integer, of the difference between first and second respective quantities received at the respective first and secoind inputs of the respective subtractor subcircuit, the outputs of the subtractor subcircuits constituting respective non-overlapping fields of the subtractor circuit output, (g) the adder circuit comprises n respective adder subcircuits, each having
  (i) a respective first input coupled to a respective one of non-overlapping fields of the second input of the apparatus,
  (ii) a respective second input coupled to a respective one of non-overlapping fields of the output of the look-up table circuit, and
  (iii) a respective output at which is generated a residue representation modulo a respective said integer of the sum of first and second quantities received at the respective first and second inputs of the respective adder subcircuit, the outputs of the adder subcircuits consitituting respective non-overlapping fields of the adder circuit output, and (c) the look-up table circuit generates each said residue representation of j in the form of n residue components each modulo a respective said integer and each at a respective one of the non-overlapping fields of the output of the look-up table circuit.

2. Apparatus for generating a residue representation modulo $p-1$ of the power index i to which a generator g has to be raised to give the value $X-Y$ in modulo p arithmetic in response to the application to said apparatus of residue representations modulo $p-1$ of x, where $g^x = X$, and y, where $g^y = Y$, which apparatus has first and second inputs for the residue representations of x and y respectively and an output for the residue representation of i and comprises (a) a subtractor circuit having
  (i) first and second inputs coupled to the first and second inputs, respectively, of the apparatus,
  (ii) and an output at which a a residue representation modulo $p-1$ of $x-y$ is generated, (b) a look-up table circuit having
  (i) an input coupled to the output of the subtractor circuit, and
  (ii) an output at which is generated a residue representation modulo $p-1$ of the power index j, to which g has to be raised to give the value $g^k+1$ in modulo p arithmetic, in response to the application to said input of the look-up table circuit of a residue representation modulo $p-1$ of any member of a set of values of k, and (c) an adder circuit having
  (i) first and second inputs coupled to the second input of the arrangement and the output of the look-up table circuit, respectively, and
  (ii) an output at which is generated a residue representation modulo $p-1$ of $r+j$ in response to the application to the first and second inputs of the adder circuit of residue representations modulo $p-1$ of r and j, respectively, which output constitutes the output of the arrangement, wherein the improvement comprises that; in order that the residue representation of i will be generated at the output of the apparatus in the form of n residue components modulo respective integers which are mutually prime and the product of which is equal to $p-1$, where n is greater than unity, and in order that the residue representations of x and y can be supplied to the first and second inputs of the apparatus each also in the form of n residue components modulo the same said respective integers;

(d) the first input of the apparatus comprises n first sub-inputs, each for receiving a respective residue representation modulo a said integer, said first sub-inputs constituting respective non-overlapping fields of said first input, (e) the second input of the apparatus comprises n second sub-inputs, each for receiving a respective residue representation modulo a said integer, said second sub-inputs constituting respective non-overlapping fields of said second input, (f) the subtractor circuit comprises n respective subtractor subcircuits, each having
  (i) a respective first input coupled to a respective one of the non-overlapping fields of the first input of the apparatus,
  (ii) a respective second input coupled to a respective one of the non-overlapping fields of the second input of the apparatus,
  (iii) a respective output at which is generated a respective residue representation, modulo a respective said integer, of the difference between first and second respective quantities received at the respective first and second inputs of the respective subtractor subcircuit, the outputs of the subtractor subcircuits constituting respective non-overlapping fields of the subtractor circuit output, (g) the adder circuit comprises n respective adder subcircuits, each having
  (i) a respective first input coupled to a respective one of non-overlapping fields of the second input of the apparatus,
  (ii) a respective second input coupled to a respective one of non-overlapping fields of the output of the look-up table circuit, and
  (iii) a respective output at which is generated a residue representation modulo a respective said interger of the sum of first and second quantities received at the respective first and second inputs of the respective adder subcircuit, the outputs of the adder subcircuits constituting respective non-overlapping fields of the adder circuit output, and (c) the look-up table circuit generates each said residue representation of j in the form of n residue components each modulo a respective said integer and each at a respective one of the non-overlapping fields of the output of the look-up table circuit.

3. Apparatus as claimed in claim 1 or claim 2, including a circuit arrangement for detecting when a representation of y which corresponds to Y=0 is applied to the second input of the apparatus and replacing any representation which would otherwise be applied to the apparatus output in response to this condition by any representation then applied to the first input of the apparatus.

4. Apparatus for generating a residue representation modulo p−1 of the power index i to which a generator g has to be raised to give the value X+A·Y is modulo p arithmetic in response to the application to said apparatus of input residue representations modulo p−1 of x, where $g^x=X$, and y, where $g^y=Y$, wherein the residue representation of i, x, and y, each consist of a respective plurality of n residue components modulo a uniform set of respective intergers which are mutually prime and the product of which is equal to p+1, the apparatus comprising:

(a) for each said integer, a separate input subtractor for receiving the input residue representations with respect to that integer, (b) a look-up table fed by the outputs of all subtractors for generating, upon reception of the subtraction results with respect to each pair or representations of x and y, a plurality of n residue components, each modulo a respective said integer and each at a respective look-up table output and together constituting a residue representation modulo p−1 of the power index j to which g has to be raised to give the value $g^k+A$, in response to the application to an input of the look-up table of a residue representation modulo p−1 of any member of a set of values of k, and (c) for each said integer, a separate adder for on a first adder input receiving the residue representation with respect to that integer of one of the input residue representations and a second adder input receiving the look-up table output corresponding to that integer for by means of addition modulo that integer collectively generating a residue representation of the sum of values received modulo p−1, wherein allowable values for A are +1, −1.

5. Apparatus as claimed in claim 4, further comprising a circuit arrangement for detecting when a representation of y which corresponds to Y=0 is applied to the second input of the apparatus and replacing any representation which would otherwise be applied to the apparatus output in response to this condition by any representation then applied to the first input of the apparatus.

* * * * *